(12) United States Patent  
Bertin et al.

(10) Patent No.: US 6,879,638 B1  
(45) Date of Patent: Apr. 12, 2005

(54) METHOD AND APPARATUS FOR PROVIDING COMMUNICATION BETWEEN ELECTRONIC DEVICES

(75) Inventors: Claude L. Bertin, South Burlington, VT (US); Anthony R. Bonaccio, Shelburne, VT (US); John A. Fifield, Underhill, VT (US); Wilbur D. Pricer, Charlotte, VT (US); William R. Tonti, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/473,935

(22) Filed: Dec. 28, 1999

(51) Int. Cl.$^7$ ............................................... H04L 27/10
(52) U.S. Cl. ....................... 375/279; 375/308; 375/329; 332/103; 329/304
(58) Field of Search .................. 375/279, 308, 375/329, 362, 259, 286; 329/304; 332/103, 104

(56) References Cited

U.S. PATENT DOCUMENTS

| | | | |
|---|---|---|---|
| 4,254,501 A | 3/1981 | Griffith et al. | .................. 375/9 |
| 4,580,277 A | 4/1986 | Angello et al. | ................ 375/67 |
| 4,612,653 A | 9/1986 | Livingston et al. | ........... 375/23 |
| 5,185,765 A * | 2/1993 | Walker | ........................ 375/238 |
| 6,044,421 A * | 3/2000 | Ishii | ........................... 375/288 |
| 6,356,580 B1 * | 3/2002 | Stephens, Sr. et al. | ...... 375/141 |

FOREIGN PATENT DOCUMENTS

| | | | |
|---|---|---|---|
| JP | 7030383 | 1/1995 | ............ H03K/5/00 |
| SU | 1458967 | 2/1989 | ............ H03K/7/04 |
| SU | 1688401 | 10/1991 | ............ H03K/9/04 |

* cited by examiner

Primary Examiner—Temesghen Ghebretinsae  
(74) Attorney, Agent, or Firm—Richard A. Henkler

(57) ABSTRACT

A method and system for providing communication between electronic devices that uses the phase of data transmitted between the devices to indicate logical one and zero values. The method and system has the added benefit of relieving the traditional limitations of voltage communication restraints between devices having differing core voltages (i.e. Differing generations).

12 Claims, 4 Drawing Sheets

METHOD AND APPARATUS FOR PROVIDING COMMUNICATION BETWEEN ELECTRONIC DEVICES

TECHNICAL FIELD OF THE PRESENT INVENTION

The present invention generally relates to methods and apparatuses that allow electronic devices to communicate with one another, and more specifically, to methods and apparatuses that provide this communication using phase modulation.

BACKGROUND OF THE PRESENT INVENTION

The electronic industry is in a state of evolution spurred by the recent changes in technology which have allowed greater functionality in smaller devices. This has resulted in the explosion of new found uses for such small devices (e.g. medical, monitoring etc.), as well as greater functionality in increasingly smaller electronic devices.

The evolution has caused electronic devices to become an inseparable part of our society. Consumers are now buying and demanding electronic devices which are smaller, more powerful, and faster at unprecedented rates. These demands are constantly driving the electronic industry to exceed limitations which were previously considered unsurpassable.

One area ripe for improvement is how various electronic devices communicate with one another. Communication between various components in a system is typically accomplished using one or more buses. These buses are made up of parallel wires which provide the communication paths between the connected devices. These buses are used to send digital communication by transmitting a series of logical ones and zeros.

These buses have certain undesirable physical characteristics that must be alleviated using specialized circuits. In general, these specialized circuits limit the time periods during which information can be transmitted accurately. For example, one undesirable physical characteristic is the capacitance of each individual bus wire. Currently, driving circuits are used to charge and discharge the wiring capacitances of the individual bus lines between coupled devices. These driving circuits must also provide current where the bus lines are terminated away from the driver. As a result of their functionality, these drivers are inherently slower than the internal logic circuits residing in the devices.

Currently, these time limitations are alleviated by expanding the number of wires and physical size of the bus. Unfortunately, as electronic systems have been decreasing in size, the resulting packaging restraints now limit the ability to further increase the size of the bus to overcome the time limitations.

It would therefore, be a distinct advantage to have a method and apparatus that would alleviate the undesirable physical characteristics of the bus while maintaining desirable data transmission speeds. The present invention provides such a method and apparatus.

SUMMARY OF THE PRESENT INVENTION

The present invention is a method and system for providing communication between electronic devices. Specifically, the present invention uses the phase of data transmitted between the devices to indicate logical one and zero values. The method and system is particularly advantageous for communicating between devices having differing core voltages (i.e. Differing generations).

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 5 is a timing diagram illustrating an example of how a signal may appear when transmitted on transmission line 106 from the sender 102 according to the teachings of the present invention. It should be noted that the logical values of the output signal 106 are dependent upon which tap (zero 202 or one 204) the output signal is in phase with.

DETAILED DESCRIPTION OF THE PREFERRED EMBODIMENT OF THE PRESENT INVENTION

In the following description, numerous specific details are set forth such as specific word or byte lengths, etc., to provide a thorough understanding of the present invention. However, it will be obvious to those of ordinary skill in the art that the present invention can be practiced with different details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention, and are within the skills of persons of ordinary skill in the relevant art.

Figure 1:
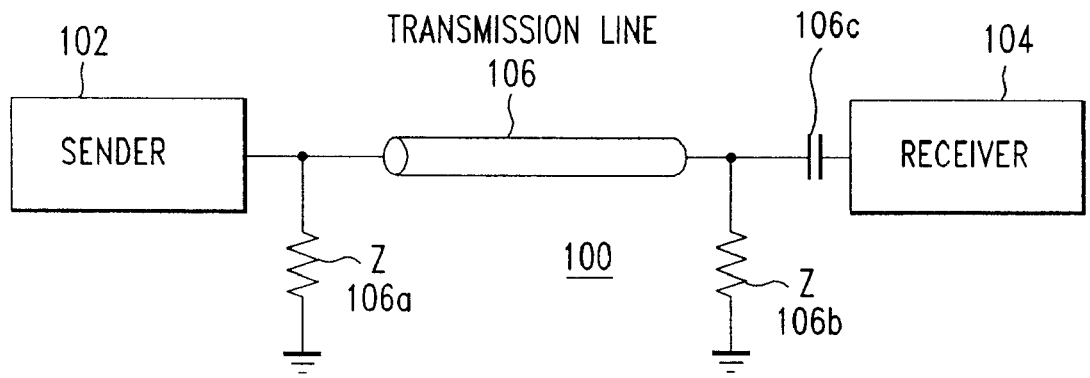
FIG. 1 is a schematic diagram illustrating a phase modulation system having a sender and receiver for providing digital communication between electronic devices according to the teachings of a preferred embodiment of the present invention.

FIG. 1 is a schematic diagram illustrating a phase modulation system 100 for providing digital communication between electronic devices according to the teachings of a preferred embodiment of the present invention. The phase modulation system 100 includes a Sender 102, a Receiver 104, and transmission line 106. Transmission line 106 is terminated at both ends via Z resistors 106a–b. In addition, a capacitor 106c has been added to the input of the Receiver 104. In practice, the phase modulation system 100 would include many such transmission lines 106. However, in order to clarify the many advantages of the present invention, only a single transmission line 106 has been shown. In addition, although transmission line 106 has been illustrated as being terminated at both ends, it could also be terminated at a single end while achieving the desired results of the present invention.

Sender 102 transmits data on the transmission line 106 using the phase of the data to indicate its logical value as explained in greater detail in connection with FIG. 2. Receiver 104 receives the data placed on the transmission line 106 and determines the logical value of the data according to its phase as explained in greater detail in connection with FIG. 4.

Figure 3:
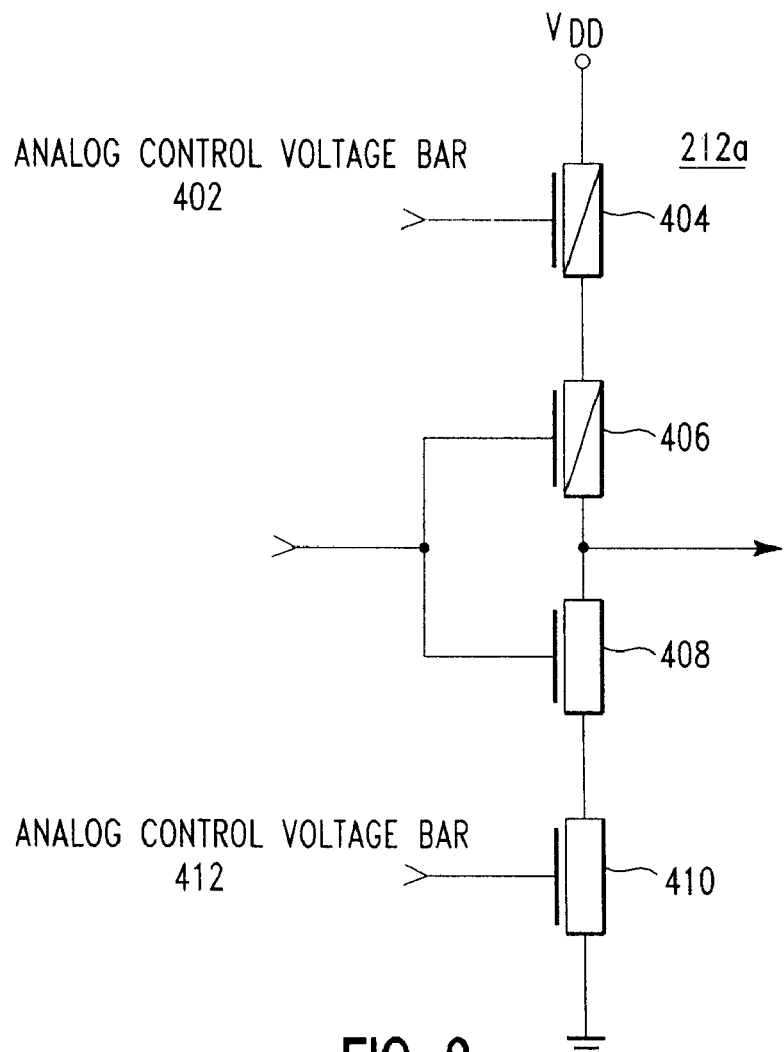
FIG. 3 is a schematic diagram illustrating one example of a circuit for implementing the dynamically controlled delay inverters of FIG. 2 according to the teachings of a preferred embodiment of the present invention.
Figure 2:
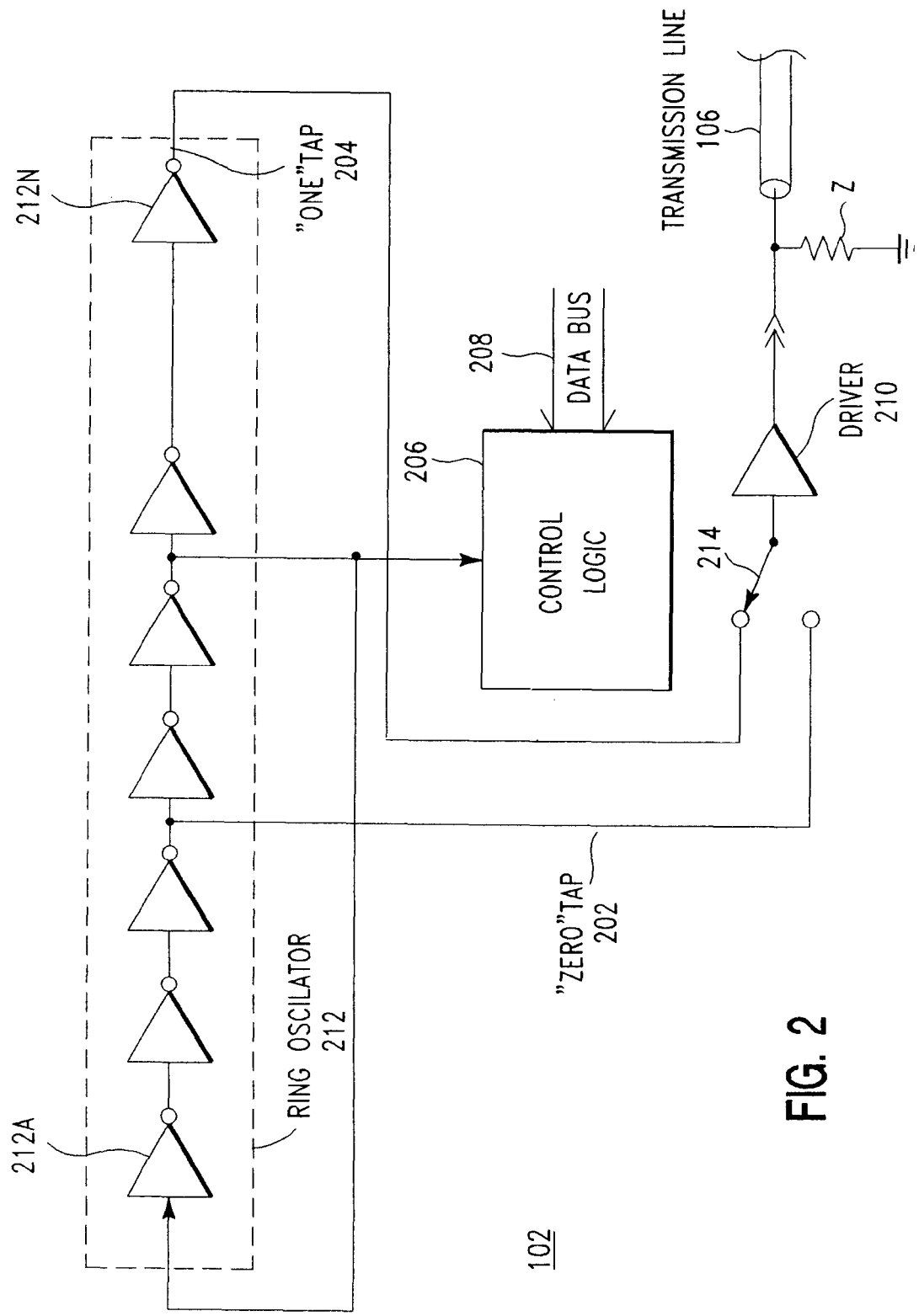
FIG. 2 is a schematic diagram illustrating in greater detail the various components of the Sender of FIG. 1 according to the teachings of a preferred embodiment of the present invention.

FIG. 2 is a schematic diagram illustrating in greater detail the various components of the Sender 102 of FIG. 1 according to the teachings of a preferred embodiment of the present invention. Sender 102 includes a Ring Oscillator 212, Control Logic 206, and a Driver 210. The Ring Oscillator 212 generates a reference square wave for use by the Control Logic 206. The Ring Oscillator 212 can be implemented in various ways provided it generates a stable frequency independent of temperature, supply voltage, and minor process variations. In the preferred embodiment, the Ring Oscillator 212 is comprised of a plurality of odd numbered inverters 212a–n having a delay that can be changed dynamically. FIG. 3 is a schematic diagram illustrating a four-device circuit that can be used as the dynamically controlled delay inverter 212a of FIG. 2 according to the teachings of a preferred embodiment of the present invention. The illustration and description of 212a is equally applicable to inverters 212b–n.

As shown in FIG. 3, the four-device circuit 212a includes two PFETS 404 and 406, and two NFETS 408 and 410. NFET 408 and PFET 406 have their respective gates connected to the input signal, and drains connected to the output node, which functions as an ordinary inverter. The sources of PFET 406 and NFET 408 are connected to PFET 404 and NFET 410 respectively, which are used to modulate the resistance, or limit the current from the VDD supply through PFET 406 and NFET 408 to ground. The propagation delay of a rising input is controlled by "Analog-Control-Voltage Bar", with delay increasing as this gate level increases toward VDD. The delay of a falling input is likewise increased as the "Analog-Control-Voltage" is decreased toward ground potential. The frequency of a ring oscillator can be adjusted by altering the delay through one or more of the ring oscillator elements.

Referring back to FIG. 2, Switch 214 is coupled to the Ring Oscillator 212 at two distinct points (zero tap 202 and one tap 204) which are 180 degrees out of phase with one another. As data is received via bus 208, the Control Logic 206 selects either the zero tap 202 or one tap 204 anytime a zero or one is to be transmitted, respectively onto the transmission line 106 for one full cycle of the clock (not shown) of the Sender 102.

Driver 210 is used for driving the selected logic phase values of one and zero onto the transmission line 106.

In an alternative preferred embodiment of the present invention, the logic value zero can be represented in any phase, and a 180 degree phase shift in the sender clock is used to represent a logical value of one. In this alternative embodiment, the Control Logic 206 changes the switch setting of the switch 214 each time a logical one value is to be sent (i.e. 180 degree phase change).

Figure 5:
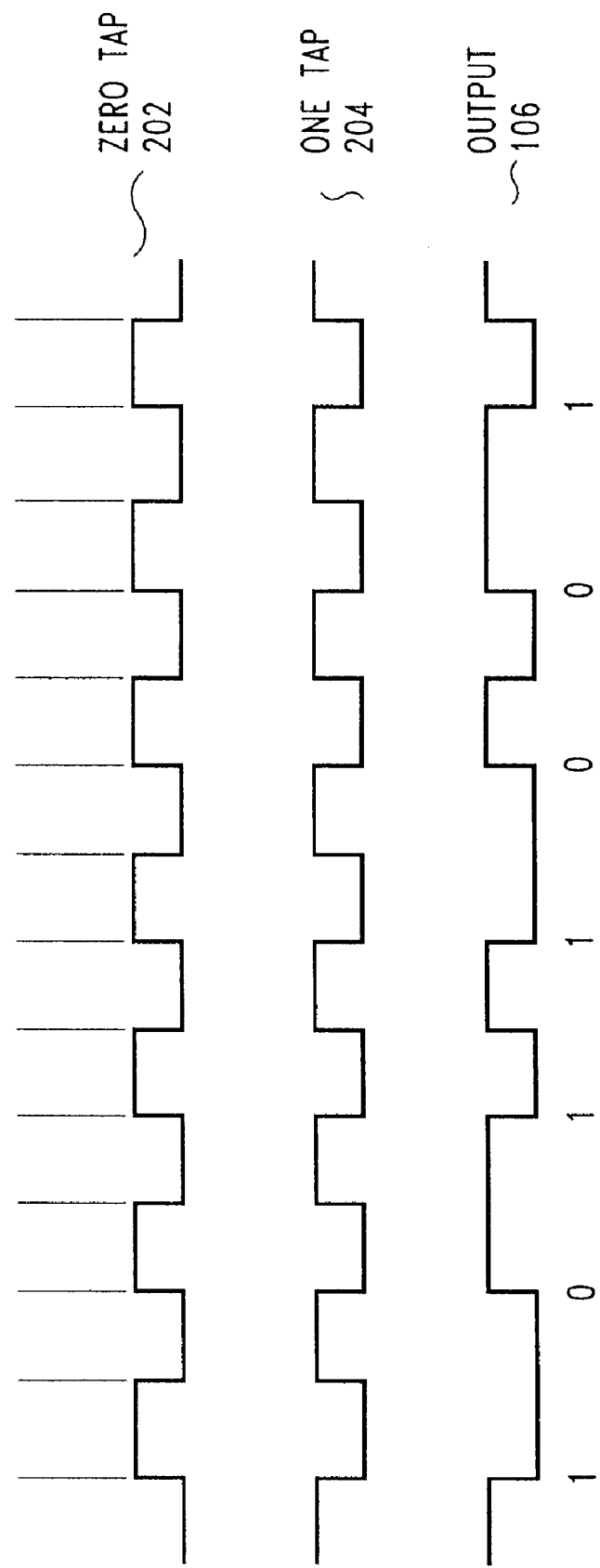

FIG. 5 is a timing diagram illustrating an example of how a signal may appear when transmitted on transmission line 106 from the sender 102 according to the teachings of the present invention. It should be noted that the logical values of the output signal 106 are dependent upon which tap (zero 202 or one 204) the output signal is in phase with.

From the above description, it can be seen that the signal transmitted from the Sender 102 is a square wave that is rapidly changing phases to indicate logical values of one or zero during cycles of the clock of the Sender 102. As a practical matter, the transmitted signal will suffer some degradation from transmission line 106 losses and/or reflections (e.g. tap stub lines, imperfectly matched termination resistance, etc.). In fact, when transmitting at the highest rate possible, the transmitted signal may even resemble a sine wave.

The present invention has eliminated many problems associated with having such a degraded signal by using the maximum difference between detecting a logical one and zero of 180 degrees. The addition of the capacitor 106c before the Receiver 104 eliminates any acquired DC components from the transmitted signal (e.g. low frequency ground currents).

Figure 4:
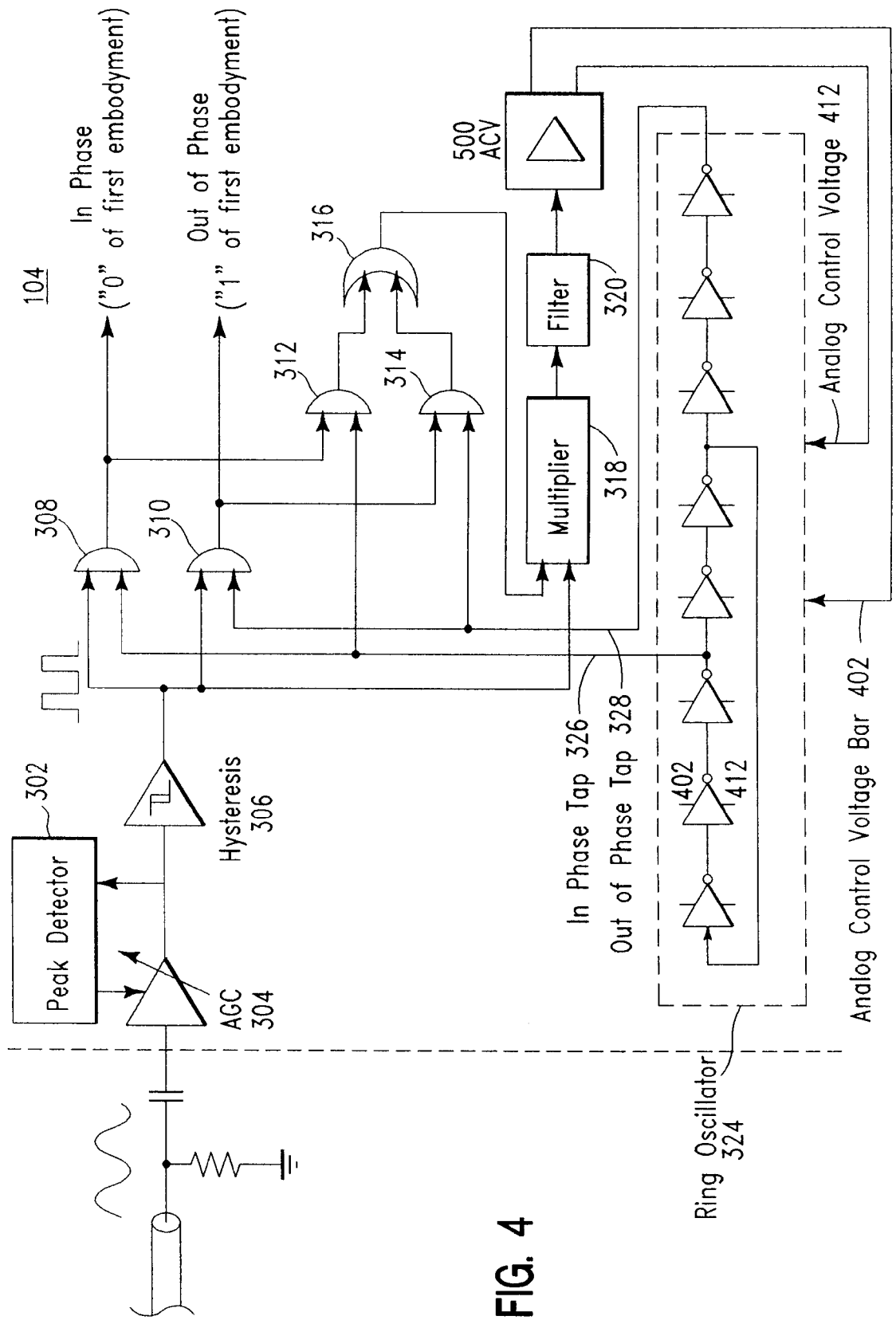
FIG. 4 is a schematic diagram illustrating in greater detail the components of the Receiver of FIG. 1 according to the teachings of the present invention.

FIG. 4 is a schematic diagram illustrating in greater detail the components of the Receiver 104 of FIG. 1 according to the teachings of the present invention. Receiver 104 includes, An Automatic Gain Control (AGC) 304, a Peak Detector 302, a Hysteresis Amplifier 306, a plurality of AND gates 308–314, an OR gate 316, a Multiplier 318, a Filter 320, an Analog Control Voltage generator (ACV) 500, and a Ring Oscillator 324.

The AGC 304 is used in combination with the Peak Detector 302 to detect the peaks of the received wave form and to restore any amplitude loss. The use of an AGC device in this manner is well understood to those of ordinary skill in the relevant art, and therefore, further discussion concerning the particular functionality is unnecessary.

The Hysteresis Amplifier 306 is an ordinary amplifying circuit with a small amount of hysteresis in order to guarantee a binary output at a suitable signal level for the AND gates 308–310, and Multiplier 318.

The Ring Oscillator 324 is comprised of a plurality of odd numbered inverters having a delay that can be changed dynamically as previously explained in connection with FIG. 3.

The two AND gates 308 and 310 determine on a moment by moment basis the logical value of the received signal by comparing it to the In Phase Tap 326 and the Out of Phase Tap 328, respectively. A high value from either 308 or 310 indicates that a logical value of zero or one was received, respectively.

In the alternative preferred embodiment where a phase change is used to merely indicate that a logical one is present, a high signal from AND gate 310 would indicate this condition.

The outputs of AND gates 308 and 310 are used to control AND gates 312 and 314, respectively. The outputs of AND gates 312 and 314 are fed to an OR gate 316. The output of the OR gate 316 is fed into a Phase Lock Loop (PLL) to determine which phase of the local Ring Oscillator 324 is to be synchronized with the incoming signal. In the preferred embodiment of the present invention, the PLL is comprised of the Multiplier 318, the Filter 320, ACV 500 and the Ring Oscillator 324. The PLL compares the phases of the output of NOR gate 316 to the output of hysteresis amplifier 306, and then multiplier 318. As a result of this comparison, the PLL generates a difference frequency which is filtered and applied to ACV 500. ACV 500 outputs analog control voltage 412 and analog control voltage bar 402, and voltage levels 412 and 402 adjust the Ring Oscillator 324 frequency until the difference frequency becomes zero.

An example of the operation of the PLL can be illustrated by assuming it has been determined that the incoming signal best matches the In Phase tap 326. As a result, the In Phase tap 326 is fed back into the PLL.

In yet another example, if it is determined that the incoming signal best matches the Out of Phase tap 328, then the Out of Phase tap 328 is fed back into the PLL.

The detailed description of Receiver 104 was made in connection with using a single wire connected to the Sender 102. In systems where the bus is narrow or a relatively slow speed, one local Ring Oscillator 324 can be adequate to maintain locked frequency and phase coherency with the Sender 102. In systems where the bus is of intermediate width or higher speed, more than one local Ring Oscillator 324 may be required. In this scenario, each local Ring Oscillator would service a cluster of adjacent communication paths within the bus. In very wide or very high speed buses, a local Ring Oscillator would be assigned to every transmission line input. Thus, each receiver across the bus is responsible for maintaining phase coherency with the sender for its own bit stream.

The frequency of the Ring Oscillator 324 of the Receiver 104 must be synchronized with the Ring Oscillator 212 of the Sender 102. The synchronization can be accomplished in various fashions depending upon the particular bus structure and the characteristic desired of the designer. The present invention is equally applicable to these various implementations.

In a multi-wire bus system, the present invention uses one of the wires to control overall communication between the Sender 102 and Receiver 104. The control wire is used to delineate two communication states. The first state is used to indicate that no message is currently being sent on the bus. During these time periods, the Sender 102 transmits a continuous stream of zeros. The Receiver 104 recognizes this protocol as an invitation to establish frequency lock and phase coherency with the Sender 102.

The second state is used to indicate that a message is about to be transmitted on the bus. The first "1" bit asserted on each data line indicates the beginning of a message. The remaining bits which immediately follow can be used as a "header" for indicating other useful information about the incoming message. For example, the message is Data, an Address, length of the message, or an instruction to be decoded.

In a single wire bus system, a preferred embodiment of the present invention uses the single wire to transmit the initialization, frequency lock and phase coherency via the error check bits. In this embodiment, the sender sends a repeating signal with a repeating error signal. In the preferred embodiment, the Sender 102 sends a long string of zeros (repeating signal) to establish coherency between local Ring Oscillator 324 and the Ring Oscillator 212 of the Sender 102. Thereafter, the Sender 102 sends a long string of alternating ones and zeros (error signal). It should be noted that phase coherency is not a concern at this point since the Receiver 104 can detect the alternating pattern. No matter which phase the receiver is in, it will sense the signal as a long string of alternating "1's" and "0's" with error checks regularly spaced 18 bits apart. The Receiver 104 will recognize this pattern as an invitation to establish coherency. After transmitting the initialization string, the Sender 102 next sends a string of zeros to establish phase coherency in the receiver. Thereafter, the Sender 102 can set the first bit as a one to indicate a message is being sent as previously described in connection with the multi-wire bus.

The present invention is applicable to any systems that use a bus to communicate data from one device to another. For example, the present invention is equally applicable to fiber optic communication where periodic pulses of light replace the electrical pulses described above (i.e. modulating the width of the pulses in a fashion similar to the phase modulation described above). In this example, the Sender 102 excites a laser, light emitting diode, or other similar light source. The Receiver 104 is coupled to a photo-diode, photo-transistor, or other similar device to produce an electrical response to the presence of light. The Capacitor 106 is still used to block spurious electrical signals created by stray or background light from noise in the transmission.

In the preferred embodiment of the present invention, Sender 102 and Receiver 104 include additional logic for establishing communication with chips having differing voltage-signaling levels (e.g. TTL (5-volts), LVTTL (3-volts), SSTL_3 (3-volts), SSTL_2 (2.5-volts), and DDRII(1.8-volts). The additional logic includes the communication between the Sender 102 and Receiver 104 for determining the maximum speed for accurate data transfers. The methods for determining the maximum speed are numerous and often design specific, and therefore, the examples enumerated below are not to be considered a limitation on the applicability of the present invention, but rather merely examples.

In one example, a first chip sends a low speed message to a second chip. If the second chip detects the message, then it sends the detected message back to the first chip. If the first chip can detect the resent message and verify its accuracy, then the first chip knows the second chip is of sufficient technology to communicate at this speed, and the transmission media is of sufficient bandwidth to support the communication at this performance. The first chip then repeats this exercise at higher data transmission rates until communication fails. At this point, each chip knows the maximum rate at which chip to chip communication can be supported.

In yet another example, a first chip sends a low speed message to a second chip. If the second chip can successfully detect this message without error checks and without resort to error correction, then the second chip resends the message at a higher data rate back to the first chip. Escalation of data rates continues until an error is noted.

In another example, each chip broadcasts a code designating its highest technology certified data rate. The two chips then choose the lowest common denominator.

The present invention is particularly useful in providing the ability to use various devices designed with differing signal level voltages. In this example, the present invention provides the ability to facilitate communication between computers and peripheral components like printers, scanners, fax machines, modems, and distant servers, all designed with differing core voltages. In other words, equipment designed years apart could still be used with one another, regardless of the voltage scaling inherent with developing technology. This capability is also applicable to servers and subsystems of various ages.

It is thus believed that the operation and construction of the present invention will be apparent from the foregoing description. While the method and system shown and described has been characterized as being preferred, it will be readily apparent that various changes and/or modifications could be made wherein without departing from the spirit and scope of the present invention as defined in the following claims.

What is claimed is:

1. A method of communicating data between first and second electronic devices, the method comprising the steps of:

selecting a first phase for representing a first logical value;

selecting a second phase that is different from the first phase for representing a second logical value;

sending a synchronization signal from a sending electronic device to a receiving electronic device;

synchronizing, in response to receiving the synchronization signal, a detection circuit with the sending device;

sending data from the sending electronic device to the receiving electronic device;

detecting, with a detection circuit, first logical values in the received data that match the first phase; and detecting, with a detection circuit, second logical values in the received data that match the second phase.

2. An electronic device for receiving data, the electronic device comprising:

a receiver for receiving data;

a phase generation circuit for generating two signals each having a phase that is different from one another; and a phase detection circuit for comparing the phases of the two generated signals with the phase of the received data, and for indicating when the phase of the received data matches either of the two generated signals.

3. The electronic device of claim 2 wherein the two generated signals are used to represent a logical zero and one, respectively.

4. The electronic device of claim 3 wherein the receiver includes:

means for detecting the peaks of the received data; and means for amplifying the received data to a predetermined voltage level.

5. The electronic device of claim 3 further comprising:

means for synchronizing the phase generation circuit with an electronic device sending the received data.

6. An apparatus comprising:

a bus for transmitting data from one electronic device to another;

a clock for generating cycles during which data can be transmitted onto the bus;

a sender phase generation circuit for generating two sender signals each having a phase different from the other;

a control circuit for selecting one of the two sender signals to send data onto the bus during any given clock cycle; and a receiver, coupled to the bus, for receiving the sent data, and for determining the logical values of the received data according to the phase of the received data.

7. The apparatus of claim 6 wherein the receiver includes:

a receiver phase generation circuit for generating two receiver signals each having a phase that is different from one another; and a phase detection circuit for comparing the phases of the two receiver signals with the phase of the received data, and for indicating when the phase of the received data matches either of the two receiver signals.

8. A method of communicating data between a first and a second electronic device each having an oscillator, the method comprising the steps of:

establishing, independent of one another, a common oscillator frequency for the first and second oscillators;

transmitting the logical values of the data according to a selected phase of the first oscillator;

detecting the logical values of received data when the data is in phase with a selected phase of the second oscillator; and synchronizing phase and frequency between the first and second oscillators when a selected type of data is transmitted.

9. The method of claim 8 wherein the step of detecting includes the step of:

detecting first logical values in the received data that match the first period.

10. The method of claim 9 wherein the step of detecting includes the step of:

detecting second logical values in the received data that match the second period.

11. The method of claim 10 further comprising the step of:

sending a synchronization signal from the sending electronic device to the receiving electronic device.

12. The method of claim 11 wherein the steps of detecting are accomplished using a detection circuit, and the method further comprises the step of:

synchronizing, in response to receiving the synchronization signal, the detection circuit with the sending device.

* * * * *